(12) United States Patent
Jonsson et al.

(10) Patent No.: US 12,723,912 B2
(45) Date of Patent: Sep. 1, 2026

(54) CLASSIFYING VIBRATIONS

(71) Applicant: ASSA ABLOY AB, Stockholm (SE)

(72) Inventors: Tomas Jonsson, Rönninge (SE); Mats Cederblad, Hässelby (SE); Per Mackegård, Solna (SE); Stefan Johansson, Stockholm (SE)

(73) Assignee: ASSA ABLOY AB, Stockholm (SE)

( * ) Notice: Subject to any disclaimer, the term of this patent is extended or adjusted under 35 U.S.C. 154(b) by 1120 days.

(21) Appl. No.: 17/285,832

(22) PCT Filed: Oct. 31, 2019

(86) PCT No.: PCT/EP2019/079761
§ 371 (c)(1),
(2) Date: Apr. 15, 2021

(87) PCT Pub. No.: WO2020/089349
PCT Pub. Date: May 7, 2020

(65) Prior Publication Data
US 2021/0389172 A1 Dec. 16, 2021

(30) Foreign Application Priority Data
Oct. 31, 2018 (SE) .................................. 1851357-2

(51) Int. Cl.
*G01H 3/06* (2006.01)
*G01H 3/12* (2006.01)
(Continued)

(52) U.S. Cl.
CPC ................ *G01H 3/06* (2013.01); *G01H 3/12* (2013.01); *G08B 13/04* (2013.01); *G08B 13/1654* (2013.01)

(58) Field of Classification Search
CPC .. G01H 3/06; G01H 3/12; G01H 3/04; G01H 3/10; G08B 13/04; G08B 13/06; G08B 13/1654
See application file for complete search history.

(56) References Cited

U.S. PATENT DOCUMENTS 3,710,082 A * 1/1973 Sloane ................ G01M 7/022 73/664
3,805,260 A 4/1974 Barowitz
(Continued)

FOREIGN PATENT DOCUMENTS

CN 101504309 8/2009
CN 103398843 11/2013
(Continued)

OTHER PUBLICATIONS

SecureHouse: A Home Security System Based on Smartphone Sensors, 2017 IEEE International Conference on Pervasive Computing and Communications (PerCom), 10 pp. (Year: 2017).*
(Continued)

*Primary Examiner* — Ricky Go
(74) *Attorney, Agent, or Firm* — Schwegman Lundberg & Woessner, P.A.

(57) ABSTRACT

It is provided a method for classifying vibrations detected in a structure of a building. The method is performed in a vibration classifier and comprising the steps of: determining a measurement period of a vibration signal; splitting the measurement period in a plurality of sequential sub-periods; calculating, for each one of the sub-periods, a variation indicator of at least one component of the vibration signal; and classifying a source of the vibration signal based on the variation indicators.

17 Claims, 3 Drawing Sheets

(51) Int. Cl.
*G08B 13/04* (2006.01)
*G08B 13/16* (2006.01)

(56) References Cited

U.S. PATENT DOCUMENTS

| | | | | |
|---|---|---|---|---|
| 4,333,093 | A | 6/1982 | Raber et al. | |
| 6,493,687 | B1 * | 12/2002 | Wu | G08B 13/04 340/544 |
| 8,077,036 | B2 | 12/2011 | Berger et al. | |
| 9,576,469 | B2 * | 2/2017 | Modi | G08B 29/185 |
| 2004/0012502 | A1 | 1/2004 | Rasmussen | |
| 2006/0276949 | A1 * | 12/2006 | Beck | A01D 75/18 701/50 |
| 2007/0008123 | A1 | 1/2007 | Swanon | |
| 2007/0290842 | A1 * | 12/2007 | Barone | G08B 13/1654 340/539.22 |
| 2011/0169638 | A1 | 7/2011 | Krumhansl et al. | |
| 2014/0369510 | A1 | 12/2014 | Barthel et al. | |
| 2015/0102609 | A1 | 4/2015 | Johnson et al. | |
| 2015/0308627 | A1 | 10/2015 | Hoskins et al. | |
| 2016/0117918 | A1 | 4/2016 | Schindler et al. | |
| 2017/0074899 | A1 | 3/2017 | Oouchi et al. | |
| 2017/0193809 | A1 | 7/2017 | Dey et al. | |
| 2017/0315516 | A1 * | 11/2017 | Kozionov | G01M 13/045 |
| 2018/0217109 | A1 | 8/2018 | Bowers, III et al. | |
| 2018/0334091 | A1 * | 11/2018 | Hwang | B62J 45/414 |
| 2019/0099886 | A1 * | 4/2019 | Chattopadhyay | G05B 23/024 |
| 2019/0107998 | A1 * | 4/2019 | Hawk | G08B 13/04 |
| 2019/0293483 | A1 * | 9/2019 | Duke | G06F 17/17 |

FOREIGN PATENT DOCUMENTS

| | | |
|---|---|---|
| CN | 104729667 | 6/2015 |
| CN | 105492874 | 4/2016 |
| CN | 106527343 | 3/2017 |
| CN | 107067608 | 8/2017 |
| EP | 2605223 | 6/2013 |
| GB | 1579777 | 11/1980 |
| GB | 1592510 | 7/1981 |
| GB | 2080592 | 2/1982 |
| GB | 2528703 | 2/2016 |
| JP | H09-147051 | 6/1997 |
| JP | 2005-030176 | 2/2005 |
| JP | 2013-058055 | 3/2013 |
| WO | WO 2009/104968 | 8/2009 |
| WO | WO 2019/238256 | 12/2019 |

OTHER PUBLICATIONS

English Translation of Official Action for China Patent Application No. 201980069261.X, dated Feb. 22, 2022, 15 pages.
Official Action for Australia Patent Application No. 2019370968, dated Oct. 25, 2022, 5 pages.
Official Action for European Patent Application No. 19801745.1, dated Feb. 23, 2023, 6 pages.
Official Action for Sweden Patent Application No. 1851357-2, dated May 3, 2019, 7 pages.
International Search Report and Written Opinion for International (PCT) Patent Application No. PCT/EP2019/079761, dated Feb. 7, 2020, 12 pages.
"EP19801745A Communication pursuant to Article 94 3 EPC mailed Apr. 30, 2024", 9 pages.

* cited by examiner

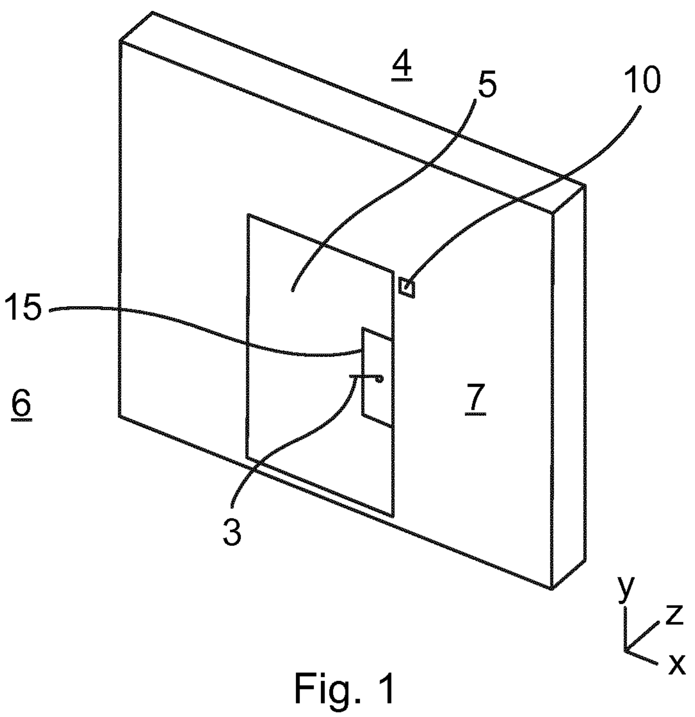
Fig. 1
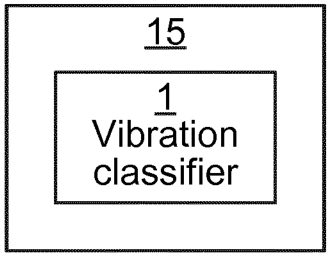
Fig. 2A
1
Vibration
classifier
Fig. 2B

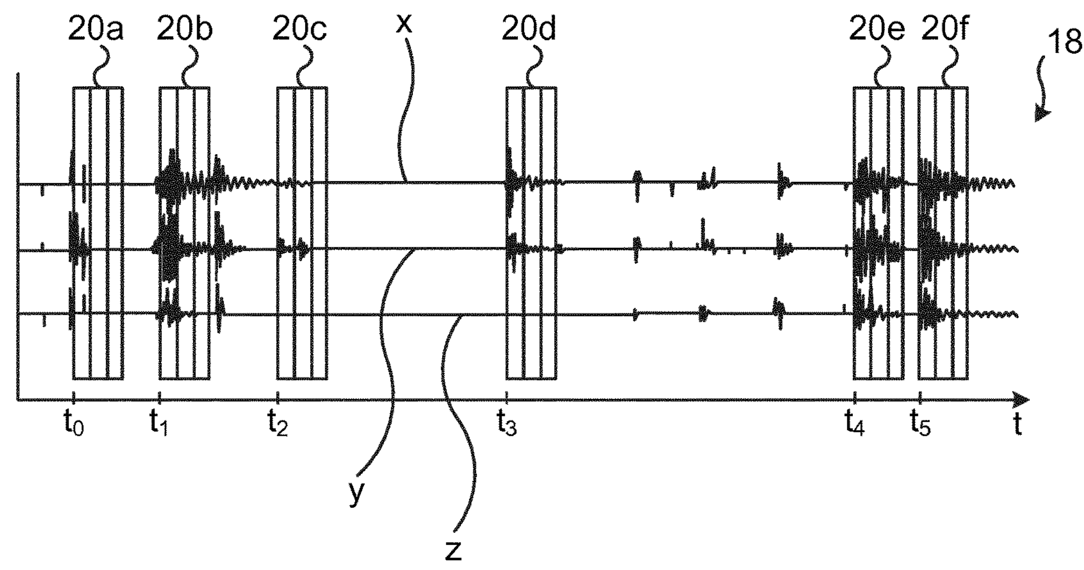
Fig. 6
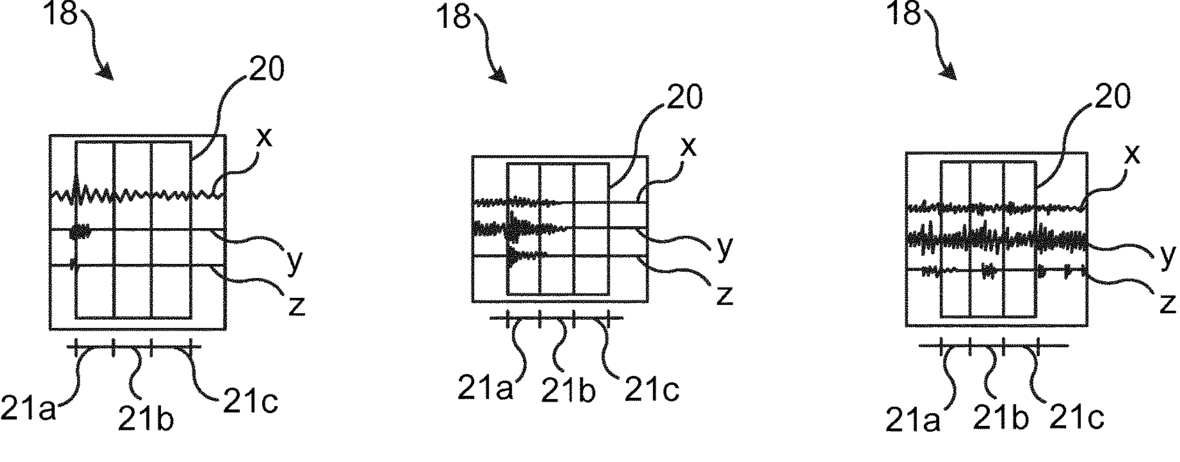
Fig. 7A
Fig. 7B
Fig. 7C

CLASSIFYING VIBRATIONS

CROSS REFERENCE TO RELATED APPLICATIONS

This application is a national stage application under 35 U.S.C. 371 and claims the benefit of PCT Application No. PCT/EP2019/079761 having an international filing date of Oct. 31, 2019, which designated the United States, which PCT application claimed the benefit of Sweden Patent Application No. 1851357-2 filed Oct. 31, 2018, the disclosure of each of which are incorporated herein by reference.

TECHNICAL FIELD

The invention relates to a method, vibration classifier, computer program and computer program product for classifying vibrations detected in a structure of a building.

BACKGROUND

It is a continuous problem with break-ins in homes and commercial properties. There are a number of sensors in the prior art to detect such break-ins. Some sensors detect when a window or door is opened or glass is broken and other sensors detect movement.

One type of such sensor is based on accelerometers. These are used for detecting vibrations that occur when a break-in attempt occurs. In this way, an alarm can be raised prior to major structural damage occurring. Some of these solutions claim to be able to differentiate between a ball bounce or knock on a door and an attempted break-in.

However, it is very difficult to find the balance between an acceptable activity and a break-in. False alarms are very stressful and result in undermined trust of the alarm system. On the other hand, a missed detection of a break-in is even worse, since the whole point of such a sensor is to detect break-ins.

Additionally, many break-ins occur when residents are home. It would be of great benefit if there would be a possibility to be able to detect break-ins even if one or more windows or doors are open, e.g. if a person is home and a garden door is open, a break-in attempt through the front door should be detectable. Indoor motion sensors are quite restricted in their use when people are home.

SUMMARY

It is an object to improve the classification of vibrations detected in structures of a building.

According to a first aspect, it is provided a method for classifying vibrations detected in a structure of a building. The is being performed in a vibration classifier and comprising the steps of: determining a measurement period of a vibration signal; splitting the measurement period in a plurality of sequential sub-periods; calculating, for each one of the sub-periods, a variation indicator of at least one component of the vibration signal; and classifying a source of the vibration signal based on the variation indicators.

In the step of determining a measurement period, the duration of the measurement period may be a predetermined value.

The predetermined value may be between 0.2 and 1.5 seconds.

The steps of determining a measurement period, splitting the measurement period and calculating may be repeated until the step of classifying is successful, wherein, for each iteration, the step of determining a measurement period may comprise determining a measurement period of the same length and being disjointed from any measurement period of other iterations.

For each iteration, the step of determining a measurement period may comprise determining the start of the measurement period when an indicator of signal level of the vibration signal is greater than a threshold value.

The step of classifying may comprise classifying a source of the vibration signal as an attack impulse when there are more than a threshold number of impulses, in respective measurement periods, within a predetermined time period.

In each iteration after a predetermined number of iterations, the step of classifying may comprise using a frequency analysis of the vibration signal.

The step of calculating may comprise calculating the variation indicator based on accumulating differences between consecutive sample values.

The step of calculating may comprise calculating the variation indicator based on accumulating squared differences between consecutive sample values.

The step of calculating may comprise calculating distinct variation indicators of components of the vibration signals in three geometric dimensions.

The step of classifying may comprise classifying the source also based on comparing variation indicators of different geometric dimensions for corresponding sub-periods.

The step of classifying may comprise classifying the source to be any one of the following: impulse, sideways movement, drilling, breaking glass and harmless situation.

The step of splitting the measurement period may comprise splitting the measurement period in three sub-periods.

According to a second aspect, it is provided a vibration classifier for classifying vibrations detected in a structure of a building. The vibration classifier comprises: a processor; and a memory storing instructions that, when executed by the processor, cause the vibration classifier to: determine a measurement period of a vibration signal; split the measurement period in a plurality of sequential sub-periods; calculate, for each one of the sub-periods, a variation indicator of at least one component of the vibration signal; and classify a source of the vibration signal based on the variation indicator.

According to a third aspect, it is provided a computer program for classifying vibrations detected in a structure of a building. The computer program comprises computer program code which, when run on a vibration classifier causes the vibration classifier to: determine a measurement period of a vibration signal; split the measurement period in a plurality of sequential sub-periods; calculate, for each one of the sub-periods, a variation indicator of at least one component of the vibration signal; and classify a source of the vibration signal based on the variation indicators.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 1 is a schematic diagram showing an environment in which embodiments presented herein can be applied;

FIGS. 2A-B are schematic diagrams illustrating embodiments of where the vibration classifier can be implemented;

FIG. 6 is a graph illustrating measurement periods of a vibration signal; and FIGS. 7A-C are graphs illustrating a vibration signal resulting from different types of events.

DETAILED DESCRIPTION

Figure 3:
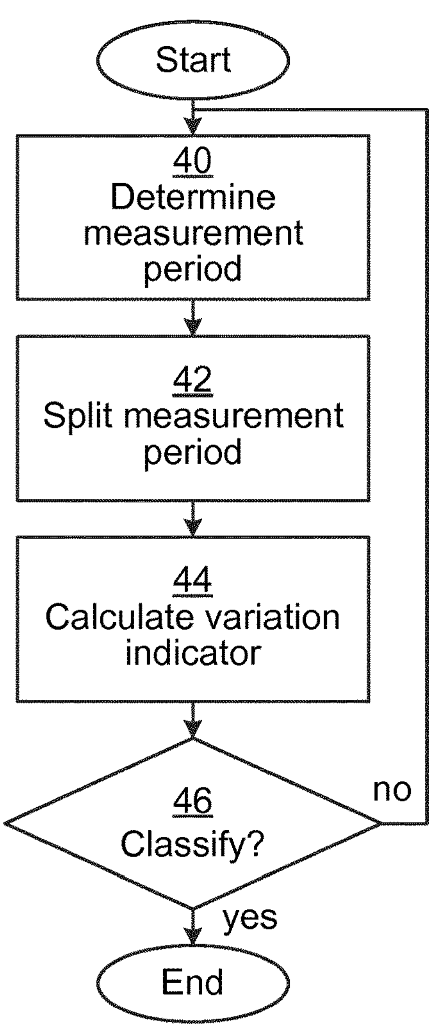
FIG. 3 is a flow chart illustrating embodiments of methods performed in the vibration classifier for classifying vibrations.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on discontinuous analysis of components of a vibration signal in measurement periods. Moreover, each measurement period is split into sub-periods and a variation indicator is calculated for each sub-period. This allows classification of the event causing the vibration signal to occur with great accuracy, while keeping power consumption very low.

FIG. 1 is a schematic diagram showing an environment in which embodiments presented herein can be applied. Access to a physical space 6 is restricted by a physical barrier 5 which is selectively controlled to be in a locked state or an unlocked state. The physical barrier 5 can be a door, window, gate, hatch, cabinet door, drawer, etc. The physical barrier 5 is provided in a surrounding structure 7 (being a wall, fence, ceiling, floor, etc.) and is provided between the restricted physical space 6 and an accessible physical space 4. The structure 7 forms part of a building. It is to be noted that the accessible physical space 4 can be a restricted physical space in itself, but in relation to this physical barrier 5, the accessible physical space 4 is accessible. A handle 3 is provided on the barrier to allow a person to open and close the barrier.

In order to unlock the barrier 5, a lock 15 is provided. The lock 15 can be a traditional mechanical lock or an electronic lock. It is to be noted that the lock 15 can be provided in the physical barrier 5 as shown or in the surrounding structure 7 (not shown).

An accelerometer 10 is provided to detect vibrations in a structure of the building. The accelerometer 10 can detect vibrations in three geometric dimensions (X, Y and Z), providing a vibration signal containing three components corresponding to the three geometric dimensions. The structure in which vibrations are detected can be the barrier 5 and/or surrounding structure 7. In this way, as explained in more detail below, the vibration can be classified e.g. as a break-in attempt or a harmless vibration. The accelerometer 10 can form part of a sensor device, or the accelerometer can e.g. form part of the lock 15 or a sensor device integrated in (or provided on) the barrier 5 or frame around the barrier 5. Alternatively, the accelerometer is provided in or by a striking plate. A crossing component is defined along a direction through the barrier. In this example, the crossing component is along the z dimension. A vertical lateral component is defined as a vertical component in a lateral direction of the barrier. In this example, the vertical lateral component is along the y dimension. A horizontal lateral component is defined as a horizontal component in a lateral direction of the barrier. In this example, the horizontal lateral component is along the x dimension.

FIGS. 2A-B are schematic diagrams illustrating embodiments of where the vibration classifier 1 can be implemented.

In FIG. 2A, the vibration classifier 1 is shown as implemented in the lock 15.

The lock 15 is thus the host device for the vibration classifier 1. In this embodiment, the lock 15 is an electronic lock. The vibration classifier 1 is also connected to an accelerometer 10. The accelerometer can form part of the lock 15, or the accelerometer could also be external to the lock 15.

In FIG. 2B, the vibration classifier 1 is shown as implemented as a stand-alone device. In this embodiment, the vibration classifier 1 does not have a host device. The accelerometer can form part of the vibration classifier 1 or can be external to the vibration classifier. The connection between the vibration classifier and the external devices could be wireless based, e.g. based on BLE or any other of the possible wireless protocols supported by the vibration classifier as mentioned below.

It is to be noted that the vibration classifier 1 does not need to be located near the accelerometer. For instance, the vibration classifier 1 can be implemented in a remote server, also known as in the cloud, with connectivity with the accelerometer, e.g. as part of an Internet of Things framework. Alternatively, the vibration classifier forms part of a sensor, i.e. an accelerometer or other vibration sensor. In one embodiment, the vibration classifier 1 forms part of a control panel. The control panel can also be used for other purposes, such as alarm, access control, smart home control, etc.

FIG. 3 is a flow chart illustrating embodiments of methods performed in the vibration classifier for classifying vibrations represented by a vibration signal of one or more components. The method can be applied gradually on the vibration signal as it becomes available or the method can be applied on a captured vibration signal once it is fully captured.

In a determine measurement period step 40, the vibration classifier determines a measurement period of the vibration signal. The duration of the measurement period is a predetermined value, e.g. between 0.2 and 1.5 seconds. A suitable length to balance power requirements and classification accuracy has been found to be 0.8 seconds.

The start of the measurement period can be determined to be when an indicator of signal level of the vibration signal is greater than a threshold value. In other words, when there is an acceleration greater than a threshold value in any one of the components of the vibration signal, the start of the measurement period can be determined. The indicator of signal level can e.g. be an acceleration value. The threshold value can be a constant value, a configurable value, or an automatically adjusted value.

The vibration signal comprises one or more components, e.g. geometric components such as X, Y and Z components.

In a split measurement period step 42, the vibration classifier splits the measurement period in a plurality of sequential sub-periods. The number of sub-periods can be any number of sub-periods greater or equal to two. For instance, the measurement period can be split in three sub-periods which has been found to provide accurate classification of the vibration signal. More sub-periods than three can give a greater resolution for the classification, but requires more power use.

In a calculate variation indicator step 44, the vibration classifier calculates, for each one of the sub-periods, a variation indicator of at least one component of the vibration signal in the measurement period. In other words, measurements of the vibration signal are obtained (using an accelerometer) for the measurement period, upon which the variation indicator is calculated. The variation indicator is calculated separately for each component (e.g. X, Y, Z) of the vibration signal. In other words, distinct variation indicators can be calculated of components of the vibration signals in three geometric dimensions. The variation indicator can e.g. be based on (or even equal to) accumulating differences between consecutive sample values of the vibration signal component in the sub-period. The difference is here the absolute (i.e. non-negative magnitude) value of one value subtracted by another. For instance if samples contain values of 1, 4, 9, 2, −5, the differences between consecutive samples are 3, 5, 7 and 7. Accumulating the differences gives a variation indicator of 3+5+7+7=22. This is an efficient way of calculating a variation indicator. It is to be noted that the number of samples in a sub-period can be many more (e.g. in the hundreds or thousands) than the five samples in this example. Optionally, the differences can be squared prior to accumulation (in which case the order of subtraction of terms to find the difference is made irrelevant).

Greater variations in vibrations result in a greater variation indicator, thus being indicative also of vibration energy. For instance, consider two signals with the same amplitude and signal shapes but different frequencies. The signal with higher frequency will result in a greater variation indicator, reflecting the increased energy.

In one embodiment, the variation indicator is based on FFT (Fast Fourier Transform) of each component of the vibration signal. This would provide different energy levels for different frequency ranges, further improving granularity of the data used for the classification at the cost of adding the FFT processing including increased sampling frequency to support the FFT.

In a conditional classify step 46, the vibration classifier classifies a source of, i.e. an event causing, the vibration signal based on the variation indicators. Optionally, the classification is also based on comparing variation indicators of different geometric dimensions for corresponding sub-periods.

The classification can find the source/event to be any one of the following: impulse, sideways movement, drilling, breaking glass and harmless situation.

An example of a harmless situation is a person entering or closing a door, strong winds, hail, hammering a nail on the inside, ball bounce and bird flying into a window. Optionally, the classification distinguishes between different harmless situations. Accurate classification of a harmless situation is just as important since this allows potential break-in situations to be taken more seriously. Optionally, the classification of harmless situations is also based on a signal indicating legitimate use of the barrier. For instance, an accelerometer placed on an inside handle of a window can detect when the handle is opened, indicating legitimate use. This can be used in the classification to determine that a harmless situation occurs. Another example of a signal indicating legitimate use is detection of a bolt movement or latch movement of the lock 15, e.g. based on a proximity sensor. Another example of a signal indicating legitimate use is detection of espagnolette movement.

The classification can be based on known signal patterns for each classification result. For instance, drilling in wood results in relatively uniform variation indicators in the sub-periods, while an impulse results in decreasing variation indicators over consecutive sub-periods. Furthermore, an impulse has more vibrations orthogonal to the barrier face (e.g. door or window pane). A sideways movement (e.g. crowbar) results in decreasing variation indicators over consecutive sub-periods but with more uniform variation indicators across geometric components. A break-in impulse can be differentiated from a harmless impulse by the break-in impulse being repeated more aggressively (i.e. more often), resulting in more measurement periods. Drilling in a lock results in a large number of impulses over time.

The signals can vary depending on model and manufacturer of the barrier (e.g. door or window) and/or the type of surrounding structure (e.g. a brick wall or a stud wall), which can be considered in the classification.

Alternatively, the classification can be based on a machine learning model. The machine learning model can then have input features comprising the variation indicators for the sub-periods for the components of the vibration signal, and the output is then the classification.

In one embodiment, the classification can classify a source of the vibration signal as an attack impulse when there are more than a threshold number of impulses, in respective measurement periods, within a predetermined time period. An attack impulse is any impulse which is not harmless. The attack impulse can be classified into a more detailed event or source later. Optionally, the threshold number of impulses depends on the intensity of the vibration. For instance, a hailstorm may result in a great number of impulses, but the magnitude of each one is very small. In one embodiment, an impulse needs to exceed a certain intensity to be considered. When the threshold number of impulses is not exceeded in the predetermined time period, this is optionally classified as a harmless situation.

Optionally, in each iteration after a predetermined number of iterations, the classification comprises using a frequency analysis, e.g. FFT or wavelets, of the vibration signal. This gives more accurate classification, but consumes more power, in part due to increased sampling frequency to support the frequency analysis. By only applying the frequency analysis after a predetermined number of iterations, the frequency analysis is more power efficient than if applied each time the method is performed.

In one embodiment, the variation indicators for the horizontal and vertical lateral components in a sub-period are summed and an event is indicated when the sum is greater than a threshold. This has been found a particularly useful way to detect a glass breaking event. This implements a high pass filter of energy in the lateral directions.

In one embodiment, the variation indicators for the horizontal and vertical lateral components in a sub-period are squared (as mentioned above) and summed and an event is indicated when the sum of squares is greater than a threshold. Also this has been found a particularly useful way to detect a glass breaking event. Compared to the embodiment where there is no square calculation, this embodiment has even greater high pass filter characteristics. This is particularly useful for detecting a breaking glass event, since breaking glass contains strong high frequency components.

The embodiments based on the sum of the variation of lateral components are so accurate that they also can be used to detect a nail-based glass-breaking event. In this case, an attacker hammers a nail through the glass to crack and break it. The nail-based glass-breaking event is difficult to detect using other methods.

In one embodiment, the variation indicators for the horizontal and vertical lateral components in a sub-period are summed and an event is indicated when the sum is greater than the variation indicator for the crossing component (in the same sub-period) multiplied by a pre-defined constant. This has been found a particularly useful way to detect a crowbar event. When the crowbar is used, this results, at least initially, in more lateral motion than cross motion which is detected in this embodiment. Optionally, also a magnetometer of the sensor device is used in this case to detect when the distance increases between the barrier and surrounding structure. When the classification is successful, the method ends. Otherwise, the method returns to the determine measurement period step 40. For each subsequent iteration, the determine measurement period step 40 comprises determining a measurement period of the same length as the previous iteration. Moreover, the new measurement period is disjoint from any measurement period of other iterations. In other words, there is a period of the vibration signal between measurement periods which does not form part of any measurement period. For each iteration of the classify step 46, the previous measurement periods (of the same classification session) are optionally considered. In this way, the data of the previous measurement periods still contribute to the classification, further improving accuracy of the classification. The number of iterations needed to perform a classification can vary depending on the resulting classification. For instance, drilling in uniform material can often be detected in only two iterations while impulse or sideways movement typically need more iterations for reliable classification.

Using this method, a very reliable classification of vibration signals is achieved. In one embodiment, the classification is based on vibration signals from several accelerometers. This can reduce false alarms, e.g. during extreme weather.

Figure 4:
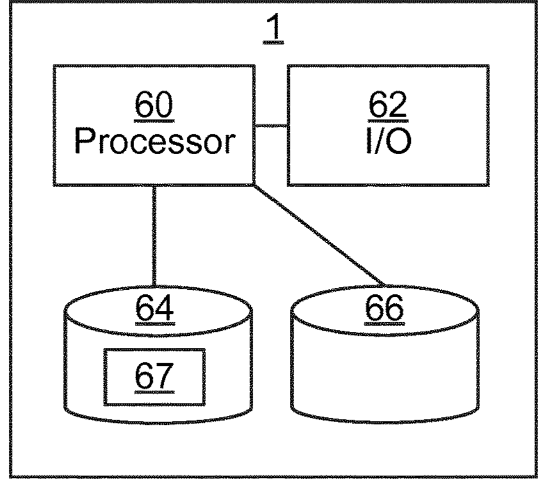
FIG. 4 is a schematic diagram illustrating components of the vibration classifier of FIGS. 2A-B.

FIG. 4 is a schematic diagram illustrating components of the vibration classifier 1 of FIGS. 3A-B. It is to be noted that one or more of the mentioned components can be shared with the host device, when present. A processor 60 is provided using any combination of one or more of a suitable microcontroller unit (MCU), central processing unit (CPU), multiprocessor, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 3 above.

The memory 64 can be any combination of random-access memory (RAM) and/or read only memory (ROM). The memory 64 also comprises persistent storage, which, for example, can be any single one or combination of solid-state memory, magnetic memory and optical memory.

A data memory 66 is also provided for reading and/or storing data during execution of software instructions in the processor 60. The data memory 66 can be any combination of RAM and/or ROM.

The vibration classifier 1 further comprises an I/O interface 62 for communicating with external entities, e.g. via a wireless interface such as Bluetooth or Bluetooth Low Energy (BLE), ZigBee, any of the IEEE 802.11x standards (also known as WiFi), etc.

Other components of the vibration classifier 1 are omitted in order not to obscure the concepts presented herein.

Figure 5:
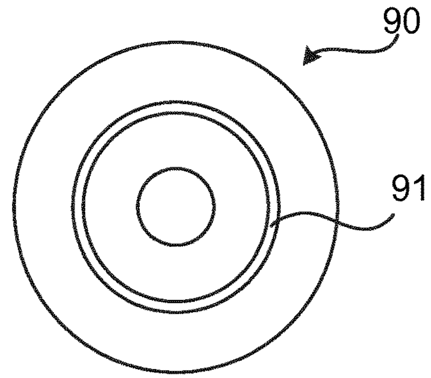
FIG. 5 shows one example of a computer program product 90 comprising computer readable means.

FIG. 5 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid-state memory, e.g. a Universal Serial Bus (USB) drive.

FIG. 6 is a graph illustrating measurement periods of a vibration signal 18. Time is represented on the horizontal axis. The vibration signal 18 consists of three components x, y, z indicating acceleration for a respective corresponding geometric dimension.

In this example, there are six measurement periods 20*a-f*. Each measurement period is split into three sub-periods.

The vibration classifier determines the start of each measurement period 20*a-f* at a point in time when at least one of the components x, y, z of the vibration signal 18 has a acceleration amplitude which is greater than a threshold.

FIGS. 7A-C are graphs illustrating a vibration signal resulting from different types of events. In each one of FIGS. 7A-C, a measurement period 20 is shown which has been split into three sub-periods 21*a-c*. Time is represented on the horizontal axis.

Looking first to FIG. 7A, this shows the vibration signal for an impulse. The variation (energy) decreases over time and most of the energy is orthogonal to the barrier, which, in this experiment was a window. The decreasing variation is captured in respective variation indicators for the three sub-periods 21*a-c*.

Looking now to FIG. 7B, this shows the vibration signal for a sideway movement, e.g. from a crowbar. In this instance, there is decreasing energy (which is indicated by variation indicators) over consecutive sub-periods 21*a-c* but with more uniform variation indicators across geometric components compared to the impulse illustrated in FIG. 7A.

FIG. 7C, discloses a scenario where drilling occurs. Here, the variation (energy) is relatively uniform in the sub-periods 21*a-c*, in contrast to the impulse of FIG. 7A and the sideways movement of FIG. 7B.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for classifying vibrations detected in a structure of a building, the method being performed in a vibration classifier and comprising:

determining a measurement period of a vibration signal;

splitting the measurement period in a plurality of sequential sub-periods;

calculating, for each one of the sub-periods, a variation indicator being a parameter that indicates variation of at least one component of the vibration signal, by calculating the variation indicator based on accumulating differences between consecutive sample values in the time-domain;

classifying a source of the vibration signal based on the variation indicators; and causing an alarm to trigger when the source of the vibration signal is associated with a break-in attempt.

2. The method according to claim 1, wherein in determining a measurement period, the duration of the measurement period is a predetermined value.

3. The method according to claim 2, wherein the predetermined value is between 0.2 and 1.5 seconds.

4. The method according to claim 1, wherein calculating comprises calculating the variation indicator based on accumulating squared differences between consecutive sample values.

5. The method according to claim 1, wherein calculating comprises calculating distinct variation indicators of components of the vibration signals in three geometric dimensions.

6. The method according to claim 5, wherein classifying comprises classifying the source also based on comparing variation indicators of different geometric dimensions for corresponding sub-periods.

7. The method according to claim 5, wherein classifying comprises classifying the source to be any one of the following: impulse, sideways movement, drilling, breaking glass and harmless situation.

8. The method according to claim 1, wherein splitting the measurement period comprises splitting the measurement period in three sub-periods.

9. The method of claim 1, wherein the determining a measurement period, splitting the measurement period, and calculating are repeated until the classifying is successful, wherein, for each iteration, the determining a measurement period comprises determining a measurement period of a same length and being disjointed from any measurement period of other iterations.

10. The method according to claim 9, wherein, for each iteration, the determining a measurement period comprises determining a start of the measurement period when an indicator of signal level of the vibration signal is greater than a threshold value.

11. The method according to claim 9, wherein classifying comprises classifying the source of the vibration signal as an attack impulse when there are more than a threshold number of impulses, in respective measurement periods, within a predetermined time period.

12. The method according to claim 9, wherein in each iteration after a predetermined number of iterations, classifying comprises using a frequency analysis of the vibration signal.

13. The method of claim 9, further comprising, for each iteration of classifying, measurement periods of previous iterations are considered.

14. A vibration classifier for classifying vibrations detected in a structure of a building, the vibration classifier comprising:

a processor; and a memory storing instructions that, when executed by the processor, cause the vibration classifier to:

determine a measurement period of a vibration signal;

split the measurement period in a plurality of sequential sub-periods;

calculate, for each one of the sub-periods, a variation indicator being a parameter that indicates variation of at least one component of the vibration signal, by calculating the variation indicator based on accumulating differences between consecutive sample values in the time-domain;

classify a source of the vibration signal based on the variation indicators; and cause an alarm to trigger when the source of the vibration signal is associated with a break-in attempt.

15. The vibration classifier of claim 14, wherein the instructions to determine a measurement period, split the measurement period, and calculate, when executed by the processor, are repeated until the instructions to classify, when executed by the processor, are successful, wherein, for each iteration, the instructions to determine a measurement period comprise instructions to determine a measurement period of a same length and being disjointed from any measurement period of other iterations.

16. The vibration classifier of claim 15, wherein for each iteration of the instructions to classify, measurement periods of previous iterations are considered.

17. A non-transitory computer readable medium storing a computer program for classifying vibrations detected in a structure of a building, the computer program comprising computer program code which, when run on a vibration classifier, causes the vibration classifier to:

determine a measurement period of a vibration signal;

split the measurement period in a plurality of sequential sub-periods;

calculate, for each one of the sub-periods, a variation indicator being a parameter that indicates variation of at least one component of the vibration signal, by calculating the variation indicator based on accumulating differences between consecutive sample values in the time-domain;

classify a source of the vibration signal based on the variation indicators; and cause an alarm to trigger when the source of the vibration signal is associated with a break-in attempt.

* * * * *